(12) United States Patent
Kondo

(10) Patent No.: US 7,486,465 B2
(45) Date of Patent: Feb. 3, 2009

(54) MAGNETIC SPACING CONTROL METHOD FOR MAGNETIC HEAD, READ/WRITE CIRCUIT, AND MAGNETIC DISK DEVICE USING SAME

(75) Inventor: Masao Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 11/486,328

(22) Filed: Jul. 13, 2006

(65) Prior Publication Data
US 2007/0230034 A1    Oct. 4, 2007

(30) Foreign Application Priority Data
Mar. 31, 2006    (JP) .............................. 2006-098953

(51) Int. Cl.
*G11B 21/02*    (2006.01)
*G11B 5/596*    (2006.01)

(52) U.S. Cl. ...................................... 360/75; 360/78.04

(58) Field of Classification Search ....................... None
See application file for complete search history.

(56) References Cited

U.S. PATENT DOCUMENTS 6,504,662 B2 * 1/2003 Sobey .......................... 360/25
6,798,598 B2    9/2004 Suzuki et al.
7,324,299 B1 * 1/2008 Schreck et al. ................. 360/75
2005/0057841 A1    3/2005 Stover et al.

FOREIGN PATENT DOCUMENTS

| JP | 05-020635 | 1/1993 |
| JP | 2004-281012 | 10/2004 |
| JP | 2004-342151 | 12/2004 |

* cited by examiner

Primary Examiner—Jason C Olson
(74) Attorney, Agent, or Firm—Greer, Burns & Crain, Ltd.

(57) ABSTRACT

In a magnetic disk device, a magnetic head protrudes when a write current is applied to a write element, and the protrusion amount is controlled using a heat generating element provided on the magnetic head. During read operations, power equal to the sum of a first power value and a second power value is supplied to the heat generating element of the magnetic head, and during write operations, power equal to the first power value is supplied to the heat generating element in addition to the write power. In this manner, protrusion can be controlled to compensate for scattering among the heads and changes in ambient conditions, so that overwrite characteristics can be improved, and read characteristics can also be improved.

16 Claims, 11 Drawing Sheets

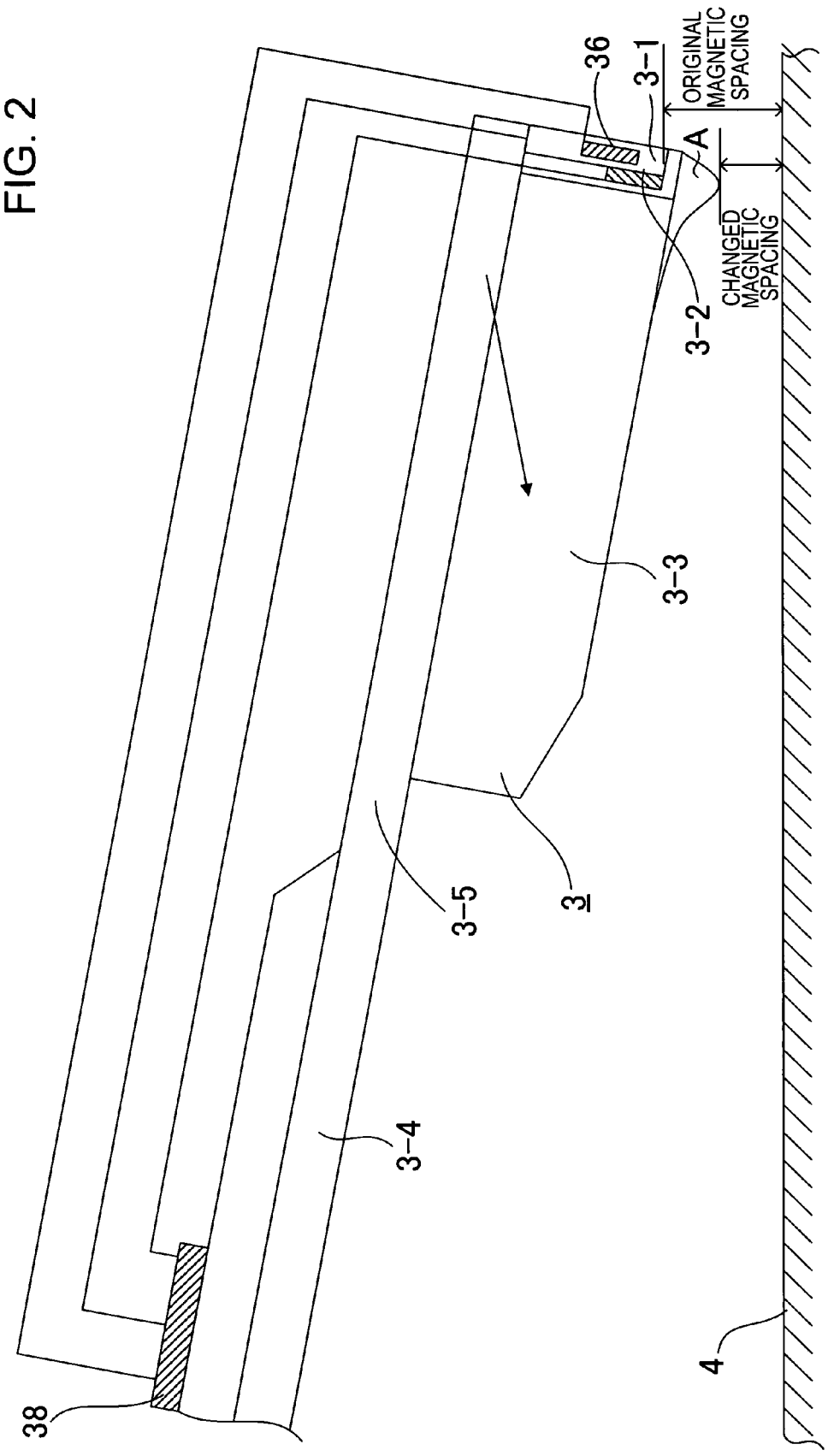

| Head No. | HEATER POWER |
|---|---|
| 0 | |
| 1 | |
| 2 | |
| ⋮ | |
| N | |

| CYLINDER POSITION (ZONE) | HEATER POWER |
|---|---|
| 1 (out) | |
| ⋮ | |
| M (IN) | |

MAGNETIC SPACING CONTROL METHOD FOR MAGNETIC HEAD, READ/WRITE CIRCUIT, AND MAGNETIC DISK DEVICE USING SAME

CROSS-REFERENCE TO RELATED APPLICATIONS

This application is based upon and claims the benefit of priority from the prior Japanese Patent Application No. 2006-098953, filed on Mar. 31, 2006, the entire contents of which are incorporated herein by reference.

BACKGROUND OF THE INVENTION

1. Field of the Invention

This invention relates to a magnetic spacing control method for a magnetic head, a read/write circuit, and a magnetic disk device which uses the read/write circuit, to control the magnetic spacing of the magnetic head with respect to the magnetic disk and improve the write characteristics, and in particular relates to a magnetic spacing control method for a magnetic head, a read/write circuit, and a magnetic disk device which uses the read/write circuit, in which, by providing a heat-generating element on the magnetic head, and through heat generation of the heat-generating element, a portion of the magnetic head is caused to protrude, to control the magnetic spacing.

2. Description of the Related Art

With the increasing sophistication of information processing in recent years, data reliability has come to be of vital importance. In magnetic recording/reproduction devices in particular, the ability to record data on the media is the most important function. A magnetic disk device stores magnetic data on magnetic recording media according to reversals of a write current generated from data. This data is read by a read head (in particular, by an MR head using the magnetoresistive effect), by converting magnetic data into electrical signal data, which is sent to a controller.

When a magnetic disk device enters write operation, first the read channel enters write mode by means of a write gate signal from the controller, and flows a write current, which depends on data, to the write head. As shown in FIG. 14, at low temperature and similar, this write head is at low temperature prior to writing, and when writing is begun the application of the write current causes the temperature to rise. This results in transient thermal stress on the magnetic poles of the write head, and as a result thermal expansion of the write poles occurs, and the write poles protrude in the media direction. This is generally called PTP (Pole Tip Protrusion).

As one phenomenon occurring at this time, at the beginning of writing there is no protrusion of poles, and the poles gradually come to protrude in keeping with the time of application of the write current; hence the magnetic spacing of a magnetic head comprising a write head and a read head is comparatively large at the beginning of writing, and the magnetic spacing decreases as writing proceeds.

For this reason, at the beginning of writing the writing ability is reduced compared with at the end of writing. This appears as degradation of the overwrite performance. As shown in FIG. 15, the closer to the beginning of writing (the first writing), the poorer is the ability to overwrite data previously written to the track, and during reading, the previous data appears as noise, so that the error rate is worsened as a result. As the write head gradually protrudes, the magnetic head approaches the media and writing is performed, so that there is a general tendency for overwriting to improve. Particularly when the magnetic disk device is used in a low-temperature environment, the temperature difference between the beginning of writing and the end of writing is large, and the first writing performance is dramatically diminished.

Further, with the rising track densities and recording densities of recent years, lower magnetic spacing for magnetic heads has become imperative (for example, spacings of order 10 nanometers have been sought). For this reason, it is become difficult to maintain a constant magnetic spacing between the magnetic recording media and the magnetic head element. For example, the magnetic head utilizes the wind pressure generated by rotation of the magnetic disk to fly above the disk surface, and so such ambient conditions as the elevation (air pressure) and temperature can cause changes in magnetic spacing, resulting in scattering in the magnetic spacing. Further, scattering among heads, cylinder positions, write current settings, and other factors can also give rise to scattering in the magnetic spacing. These factors may cause declines in write performance and drops in signal quality at times, and at times may cause such problems as element degradation, and in the worst case element destruction and similar, due to contact with the media.

In order to improve the overwrite characteristic, a method has been proposed in which the write current is increased for a fixed length of time from the start of writing, in order to improve overwriting (for example, Japanese Patent Laid-open No. 2004-281012, U.S. Pat. No. 6,798,598). This method only hastens the time for head protrusion immediately after the start of writing, but due to constraints imposed by the maximum value of the write current and the maximum allowable current of the write element, it is difficult to alleviate error rate degradation due to insufficient overwriting in the first sector.

Moreover, another prior method has been proposed in which a heater is provided within the magnetic head, and the amount of protrusion of the magnetic head is controlled through heat generation by the heater (for example, Japanese Patent Laid-open No. 5-020635).

Further, in other prior art, a method has been proposed in which a heater is provided within the magnetic head, and the heater is used to apply heating power when adjustment of the magnetic spacing is necessary, such as for example immediately before writing, and the heating power is increased temporarily to shorten the protrusion response time (for example, Japanese Patent Laid-open No. 2004-342151 (FIG. 7), U.S. Unexamined Patent No. 2005/0057841 (FIG. 7)).

However, when using the first technology of the prior art, the same heating power is applied for both reading and writing in order to adjust the magnetic spacing, and if an acoustic sensor provided in the head is used to detect heat contact, then control is executed to reduce the heating power, and protrusion due to the write current in the write element described above causes the head to make contact with the media. As a result, degradation of and damage to the head tends to occur.

When using the second technology of the prior art, the heater power is increased temporarily when there is a need to adjust the magnetic spacing, and no consideration is given to measures to counter the ambient conditions of wind pressure, temperature, or air pressure, or scattering among heads. Consequently when there are changes in ambient conditions or scattering in head parameters (and in particular among write elements), alleviation of overwrite degradation cannot be expected.

SUMMARY OF THE INVENTION

Hence an object of this invention is to provide a magnetic spacing control method for a magnetic head, read/write circuit, and magnetic disk device using such a read/write circuit, to prevent degradation of overwrite characteristics at the beginning of writing, even when there is scattering in ambient conditions or head parameters.

A further object of this invention is to provide a magnetic spacing control method for a magnetic head, read/write circuit, and magnetic disk device using such a read/write circuit, to control the magnetic spacing between the head and the magnetic recording media even when there is scattering in the ambient conditions or head parameters.

A further object of this invention is to provide a magnetic spacing control method for a magnetic head, read/write circuit, and magnetic disk device using such a read/write circuit, to prevent contact between the magnetic head and the magnetic recording media and improve the read performance and write performance, even when there is scattering in the ambient conditions or head parameters.

In order to attain the above objects, a magnetic spacing control method of this invention, which controls the magnetic spacing with respect to a magnetic disk of a magnetic head in which the write element and the read element are separated, has a step of supplying power equal to the sum of a first power value and a second power value to a heating element of the magnetic head at the time of read operation by the read element, and a step of supplying power equal to the first power value to the heating element at the time of writing by the write element of the magnetic head, and of driving the write element using a write power.

Further, a magnetic disk device of this invention has a magnetic disk which rotates; a magnetic head, in which a write element and a read element are separated, and incorporating a heating element; an actuator, which moves the magnetic head in the radial direction of the magnetic disk; and a control unit, which supplies power equal to the sum of a first power value and a second power value to the heating element of the magnetic head during read operation by the read element, and supplies power equal to the first power value to the heating element and also drives the write element using a write power during write operation by the write element of the magnetic head.

Further, a read/write circuit of this invention, to perform reading and writing of data from and onto a magnetic disk using a magnetic head in which a write element and a read element are separated, and which incorporates a heating element, has a read circuit which, during read operation by the read element, supplies power equal to the sum of a first power value and a second power value to the heating element of the magnetic head, and a write circuit which, during write operation by the write element of the magnetic head, supplies power equal to the first power value to the heating element and also drives the write element using a write power.

It is preferable that this invention further have a step, when the magnetic head seeks a target track on the magnetic disk, of supplying to the heating element a power value which is greater than the first power value, and less than the sum of the first power value and the second power value.

It is preferable that this invention further have a step, each time the value of power applied to the heating element of the magnetic head is increased, of writing data to the magnetic disk using the write element, thereafter reading the data written to the magnetic disk using the read element, and measuring a signal quality, and a step of calculating the first power value for the magnetic head from the measured signal quality.

It is preferable that in this invention, the calculation step have a step of comparing, upon each increase of the power value, the signal quality of the previous measurement with the signal quality of the current measurement; a step of detecting, in the comparison, that the signal quality of the current measurement is degraded from the signal quality of the previous measurement, and of storing the power value at the time of detection; and a step of calculating the first power value for the magnetic head from the stored power value.

It is preferable that this invention further have a step of reading from a table the first power value corresponding to a magnetic head to perform access, among a plurality of magnetic heads, and of supplying power with this power value to the heating element of the head.

It is preferable that this invention further have a step of reading from a table the first power value corresponding to the cylinder position on the magnetic disk accessed by the magnetic head, and of supplying power with this power value to the heating element.

It is preferable that this invention further have a step of reading from a table the first power value corresponding to the ambient conditions of the magnetic head, and of supplying power with this power value to the heating element.

In this invention, during read operations power equal to the sum of a first power value and a second power value is supplied to the heating element of a magnetic head, and during write operations by the write element of the magnetic head, power equal to the first power value is supplied to the heating element, while also driving the write element using a write power. Hence by means of the first power value, protrusion can be controlled according to scattering among heads and changes in ambient conditions, so that overwrite characteristics can be improved, and read characteristics can also be improved.

BRIEF DESCRIPTION OF THE DRAWINGS

FIG. 2 shows the configuration of the magnetic heads in FIG. 1;

DESCRIPTION OF THE PREFERRED EMBODIMENTS

Below, embodiments of the invention are explained, in the order of the configuration of a magnetic disk device, a first embodiment, a second embodiment, a third embodiment, and other embodiments. However, this invention is not limited to these embodiments.

Configuration of a Magnetic Disk Device

Figure 1:
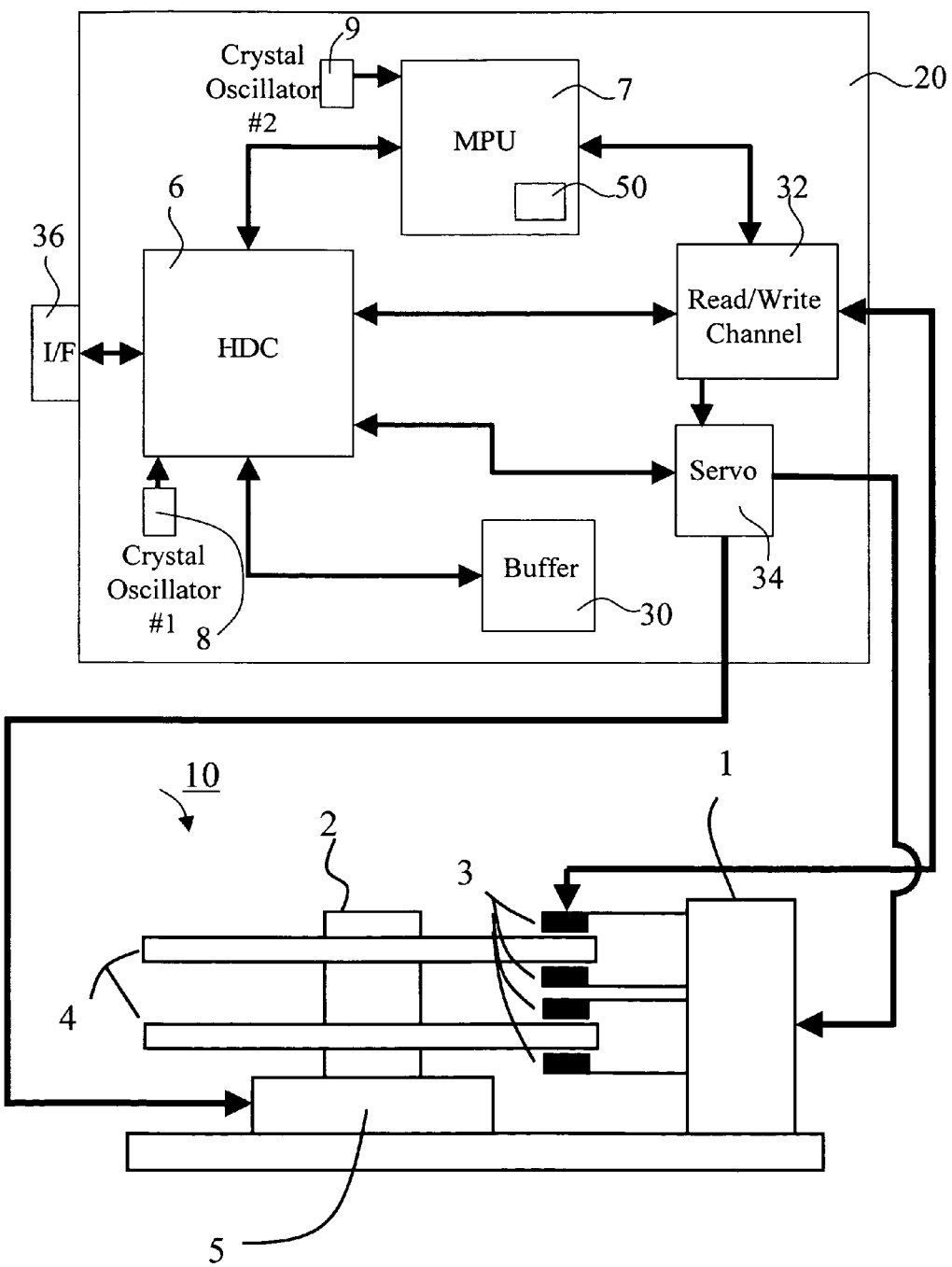
FIG. 1 shows the configuration of a magnetic disk device in one embodiment of the invention.

FIG. 1 shows the configuration of a magnetic disk device in one embodiment of the invention, FIG. 2 shows the configuration of the magnetic heads in FIG. 1, and FIG. 3 shows in detail the configuration of the magnetic heads of FIG. 1 and FIG. 2. As shown in FIG. 1, in the magnetic disk drive mechanism 10, magnetic disks 4 which are the magnetic recording media are provided on a rotating shaft 2 of a spindle motor 5. The spindle motor 5 rotates the magnetic disks 4. The actuator (VCM) 1 comprises magnetic heads 3 on the tips of a suspension assembly (see FIG. 2), and moves the magnetic heads 3 in the radial direction of the magnetic disks 4.

The actuator 1 comprises a voice coil motor (VCM) which rotates about a rotating shaft. In the figures, two magnetic disks 4 are mounted in the magnetic disk device, and four magnetic heads 3 are driven simultaneously by a single actuator 1.

The magnetic head 3 comprises a read element and a write element. The magnetic head 3 is configured by stacking the read element, comprising a magnetoresistive (MR) element, on a slider, and stacking a write element, comprising a write coil, thereupon.

On the control print board (control circuit portion) 20 of the magnetic disk drive mechanism 10 are provided a hard disk controller 6, MPU 7, clock sources 8 and 9, buffer circuit 30, read/write channel circuit 32, and servo circuit 34.

The read/write (R/W) channel circuit 32 controls reading and writing by the magnetic head 3, and has a write circuit which supplies write signals to the magnetic head 3, and a read circuit which receives and demodulates read signals from the magnetic head 3. The servo circuit 34 has a spindle motor driving circuit which drives the spindle motor 5, and a position control circuit which receives servo signals for read signals from the read/write channel circuit 32, detects the current position, and controls driving of the voice coil motor (VCM) 1 according to errors with respect to the target position.

The hard disk controller (HDC) 6 communicates with the host via the interface 36, and judges the position within one circumference with reference to the sector number of the servo signal to perform data recording and reading. The buffer random access memory (RAM) 30 temporarily stores read data and write data. The HDC 6 communicates with the host via a USB (Universal Serial Bus), ATA, SCSI (Small Computer System Interface), or other interface 36.

The microcontroller (MPU) 7 analyzes commands from the HDC 6, and performs various processing via the HDC 6. To this end, the MPU 7 has read-only memory (ROM) and random access memory (RAM) to store various programs, as well as a heating power table 50, described below.

On the magnetic disks 4, servo signals (position signals) are placed at equal intervals in the circumferential direction on each of the tracks, from the outer to the inner tracks. Each track comprises a plurality of sectors, and position signals comprise servo mark signals, Gray code track numbers, an Index, and the offset information (servo burst signals) PosA, PosB, PosC, PosD.

This magnetic disk drive mechanism 10 has a plurality of magnetic disks 4, which are stacked on a single spindle motor 5 and rotated in a fixed direction.

As shown in FIG. 2, the magnetic heads 3 are provided with a read element 3-2 (TMR or other magnetoresistive element) and a write element (induction element) 3-1 on a slider 3-3. The slider 3-3 is held by a suspension assembly 3-4.

A head IC 38 is mounted on the suspension assembly 3-4, and is electrically connected on the suspension assembly 3-4 such that read signals are transmitted from the read element 3-2, and write signals from the controller (read/write channel circuit 32) are transmitted to the write element 3-1, via the head IC 38.

The suspension assembly 3-4 is mechanically fixed onto the carriage arm of the VCM 1, and the carriage arm is provided with a bearing and the magnet and coil of a voice coil motor. The VCM 1 moves the heads 3 about the center of rotation of the bearing to cause the head 3 to position into alignment with an arbitrary circumference (called a cylinder), specified by the controller, of the media 4 which is rotated by the spindle motor 5, to read and write data according to a specified data format.

The head slider 3-3 glides over the rotating disk 4 on a cushion of air; an air bearing is formed at the surface of the slider 3-3 opposed to the surface of the disk 4, and the flying attitude is maintained by the negative pressure generated therefrom and by the spring force of the suspension assembly 3-4 and gimbal portion 3-5.

Figure 3A:
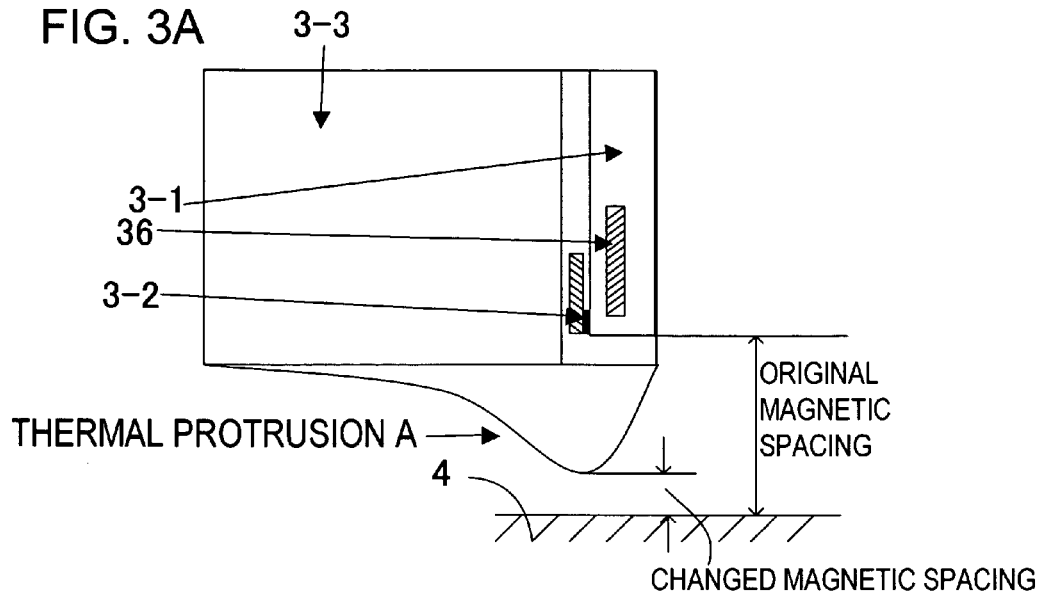
FIGS. 3A and 3B show in detail the configuration of the magnetic heads of FIG. 1 and FIG. 2.
Figure 3B:
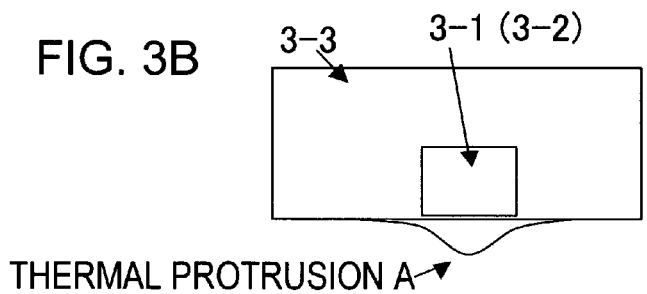

As is also shown in the side view of FIG. 3A and in the front view of FIG. 3B, a heater 36 is provided at a location near the head portions 3-1 and 3-2. Here, a resistor 36 is provided, via an insulating layer, on the side of the write coil of the write element 3-1. By this means, a protrusion a similar to that due to the write coil can be caused.

As is shown in FIG. 2, the heater 36 is also connected to the head IC 38, and moreover receives heating power from the controller (read/write channel circuit 32) via the head IC 38, to generate heat. As shown in FIG. 2 and FIG. 3A, the gap between the lower end of the read element 3-2 and the face of the magnetic disk 4 is the original magnetic spacing; the gap between the lower end of the protrusion A and the magnetic disk 4 is the magnetic spacing deformed by the protrusion.

First Embodiment

Figure 4:
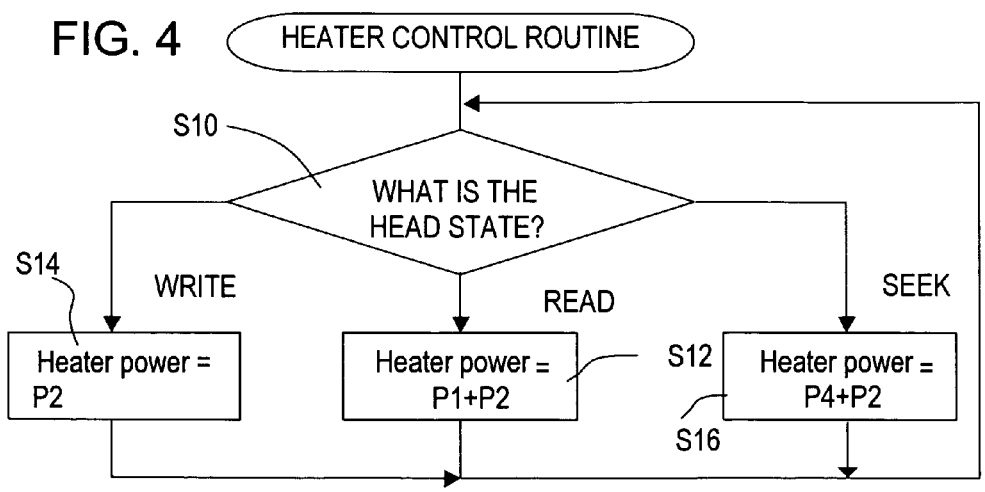
FIG. 4 shows the flow of head protrusion processing in one embodiment of the invention.
Figure 5:
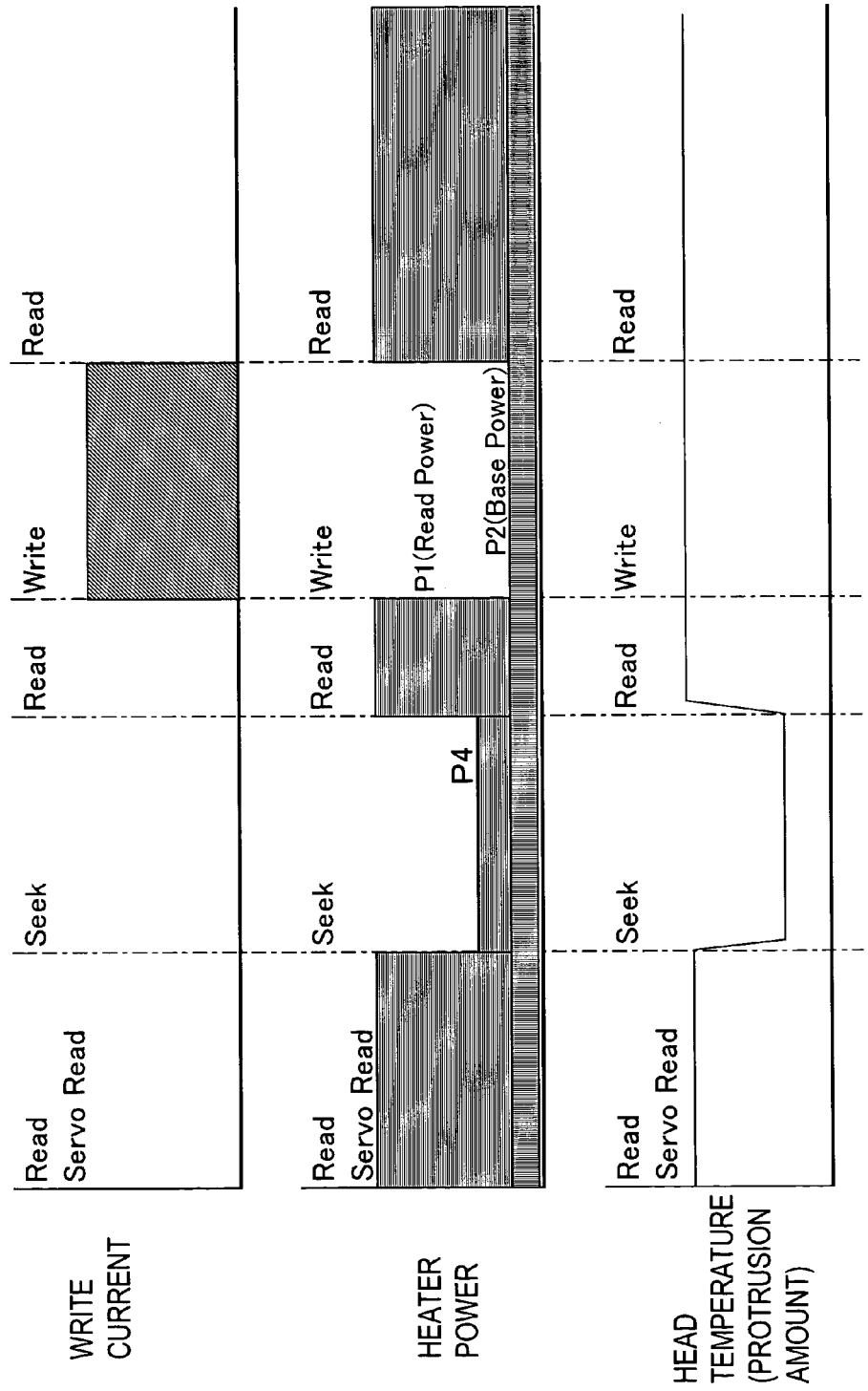
FIG. 5 explains heater control in one embodiment of the invention.

FIG. 4 shows the flow of processing in a first embodiment of a head magnetic spacing control method of this invention; FIG. 5 is a timing chart for same. In this embodiment, during reading and writing by the head 3, a base power P2 is applied to the heater 36, scattering in the amount of protrusion of the head 3 is corrected; in addition, during reading a read power P1 is further applied to the heater 36.

The processing in FIG. 4 is explained referring to FIG. 5.

(S10) The read/write channel circuit 32 enables reading and writing in response to a read/write enable signal Enable for the magnetic head 3, in response to an instruction from the HDC 6; a R/W gate signal R/NG, which is "high" for reading and "low" for writing, is sent to the head IC 38.

(S12) Here the read/write channel circuit 32 supplies power (P1+P2) to the heater 36 of the magnetic head 3 during a read interval, which is the interval in which the R/W gate signal is "high", causing the heater 36 to generate heat. (S14)

On the other hand, the read/write channel circuit 32 supplies power P2 to the heater 36 of the magnetic head 3 during a write interval, which is the interval in which the R/W gate signal is "low", causing the heater 36 to generate heat. The read/write channel circuit 32 supplies a write power which corresponds to the data to the write element 3-1 of the magnetic head 3 during the write interval, which is the interval in which the R/W gate signal is "low".

(S16) Further, during a seek interval the read/write channel circuit 32 supplies power (P4+P2) to the heater 36 of the magnetic head 3, causing the heater 36 to generate heat.

As shown in FIG. 5, the power value P1 is power applied only during reading, while the power value P2 is heating power which is always applied. During reading, the head 3 is caused to protrude in advance by the heater 36 in order that the protrusion is the same as during writing. Upon switching to writing, when the heat generation power of the heater 36 is reduced, by using power to drive the write element 3-1 the protrusion amount can be controlled so as to always be a constant value. By this means, the state of the head 3 can be caused by heat to protrude prior to writing, so that the performance at the beginning of writing can be improved.

Here, the power value P2 which is always applied is used to correct scattering for ambient conditions and between heads; power is always applied, regardless of whether writing or reading is performed. By this means, in this invention not only are characteristics improved at the beginning of writing, but the optimum protrusion amount can be set according to ambient conditions, the head parameters, and the cylinder position. The protrusion is also controlled during reading, contributing to improvement of the reading S/N ratio.

In FIG. 5, during servo signal reading (Servo Read) and data reading (Read) operations, the power (P1+P2) is applied to the heater 36, and during writing, the power P2 is applied. During seek control, the head 3 moves, and the magnetic spacing becomes unstable due to wind pressure, so that a smaller protrusion amount of the head 3 is preferable; but because the servo information must be read, a power P4 necessary to ensure reading is added to the scattering correction power P2, to cause heating by the heater 36 and control the protrusion.

In this way, overwrite degradation due to PTP immediately after the start of writing can be prevented, the S/N during reading can be improved, and optimum write performance can be secured for the ambient conditions, cylinder position, head scattering, air pressure changes, and similar.

Second Embodiment

Figure 6:
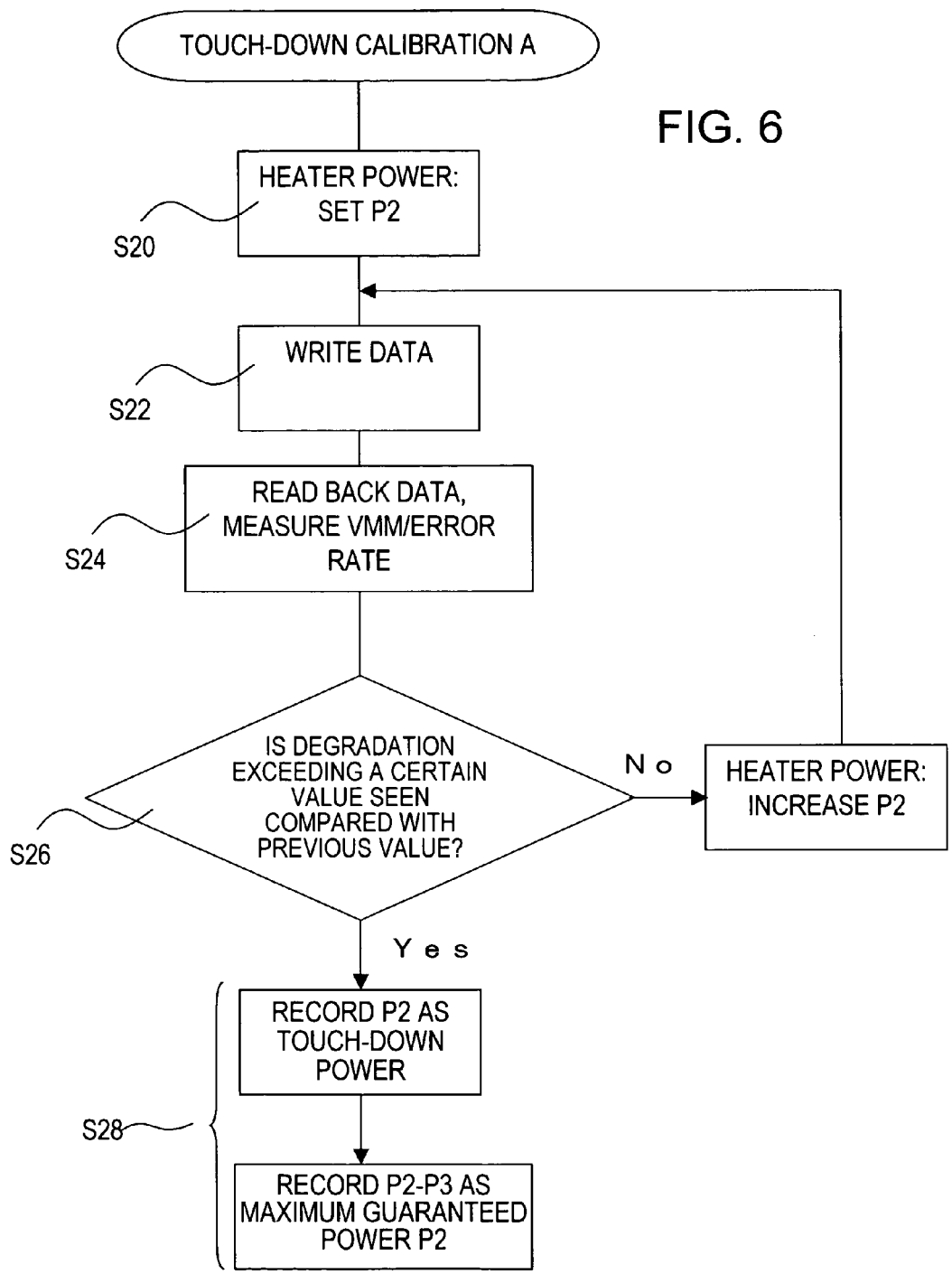
FIG. 6 shows the flow of measurement processing in one embodiment of the invention.

FIG. 6 explains a second embodiment of the invention, and shows the flow of processing to measure the scattering correction power. The scattering correction power P2 described above can be determined for design purposes if scattering among magnetic heads is within a certain constant range.

However, measurements are effective for determining the scattering correction power P2 corresponding to any one of, or a plurality among, the cylinder position, air pressure, temperature, and scattering among heads.

FIG. 6 explains measurement processing.

(S20) The MPU 7 sets the heating power P2 to an initial value, and issues an instruction to the HDC 6 to begin measurements.

(S22) The HDC 6 issues a write instruction to the read/write channel circuit 32 and specifies a heating power P2. The read/write channel circuit 32 first supplies power P2 to the heater 36 of the magnetic head 3, causing the heater 36 to generate heat. Next, during the write interval in which the R/W gate signal is "low", the read/write channel circuit 32 supplies write power to the write element 3-1 of the magnetic head 3 according to the measurement data.

(S24) The read/write channel circuit 32 causes the read element 3-2 of the magnetic head 3 to read measurement data which has been written, and measures the quality of the read data. For example, measurements may be performed using maximum-likelihood information (the Viterbi metrics margin) or the error rate, obtained from a maximum-likelihood decoder.

(S26) The MPU 7 receives this measured signal quality value from the read/write channel circuit 32 via the HDC 6, and compares the signal quality value of the previous measurement with the signal quality value of the current measurement. From this comparison, the MPU 7 judges whether the signal quality value of the current measurement has been degraded by a prescribed amount compared with the signal quality value of the previous measurement. If the MPU 7 judges that the signal quality value of the current measurement is not degraded by a prescribed amount compared with the signal quality value of the previous measurement, the heating power P2 is increased by a prescribed amount, and processing returns to step S22.

(S28) On the other hand, if the MPU 7 judges from this comparison that the signal quality value of the current measurement has been degraded by a prescribed amount compared with the signal quality value of the previous measurement, the MPU 7 then judges that the protrusion amount of the magnetic head 3 at this heating power P2 exceeds the peak of the maximum value of the signal quality, and has shifted to the direction of degradation. That is, when protrusion of the magnetic head 3 is such that the magnetic disk becomes too close, or makes contact, then the signal quality changes from the direction of improvement to the direction of degradation. This is called the touch-down power, and is recorded as the heating power P2. When using this heating power P2, because the protrusion amount during writing is further increased by the write current, the signal quality is further degraded, and so a heating power P3 which ensures the minimum magnetic spacing is subtracted from this measured heating power P2, and the result is stored in the table 50 (see FIG. 1) as the maximum guaranteed power (that is, the above-described correction power) P2.

Figures 7, 8:
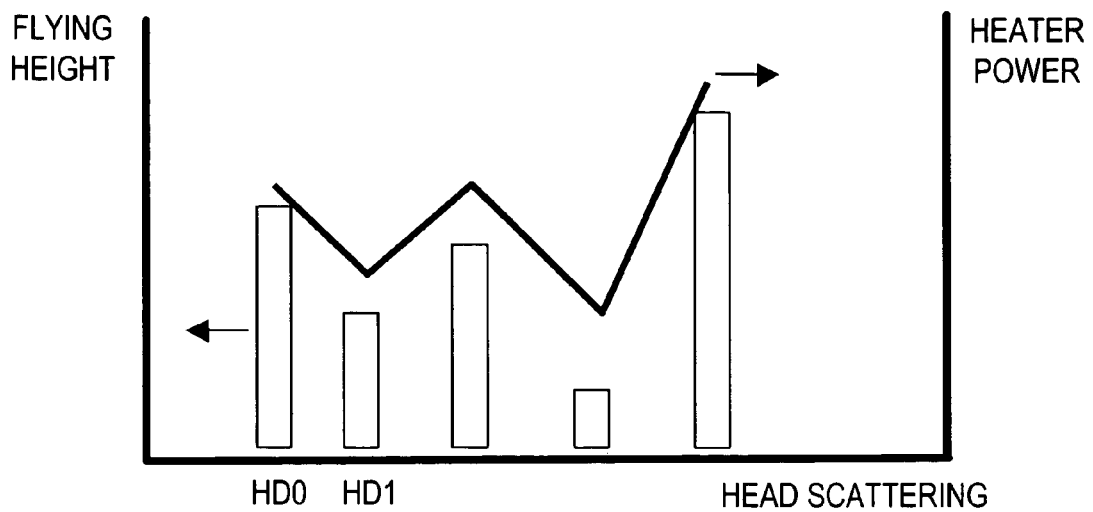
FIG. 7 explains the relation between heads, magnetic spacing, and heating power in the first embodiment of the invention.
FIG. 8 explains the heating power table for the relationship in FIG. 7.

The corresponding scattering correction power P2 is measured in this way for each head. FIG. 7 shows scattering in the magnetic spacing and heating power for different heads; for each head the correction power is measured, and as shown a table 50 in FIG. 8, the correction power (heating power) P2 is stored in association with a head number in a table 50. The MPU 7 references the table 50 according to the number of the head accessed by the HDC 6, retrieves the corresponding heating power P2, notifies the HDC 6, and applies the heating power P2 to the heater 36 of the magnetic head 3 during reading and writing.

Figure 9:
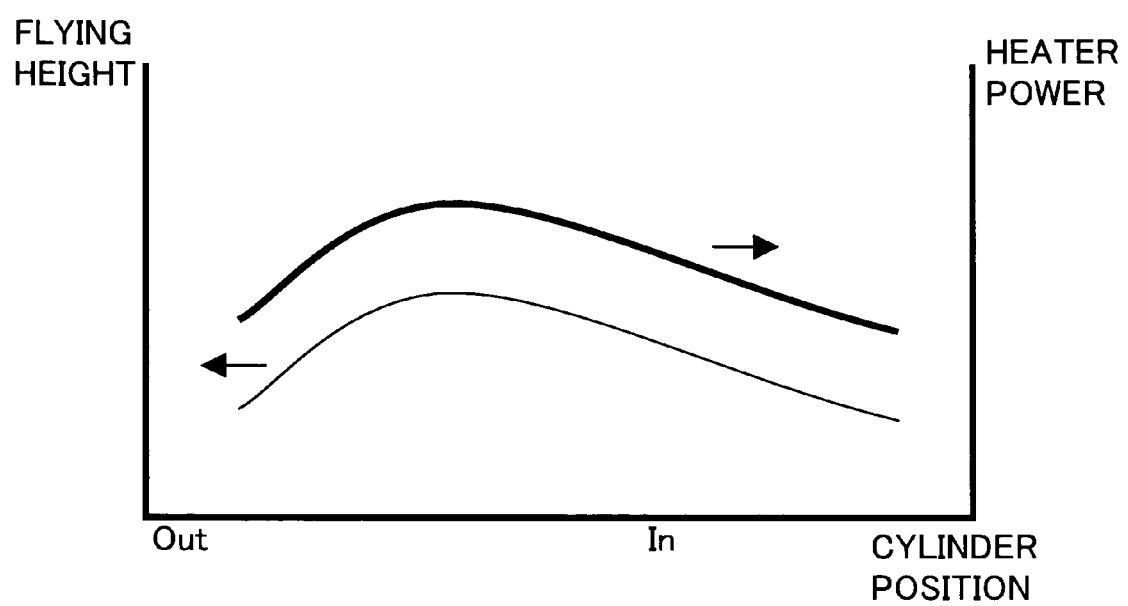
FIG. 9 explains the relation between cylinder position, magnetic spacing, and heating power in a second embodiment of the invention.
Figures 10, 11:
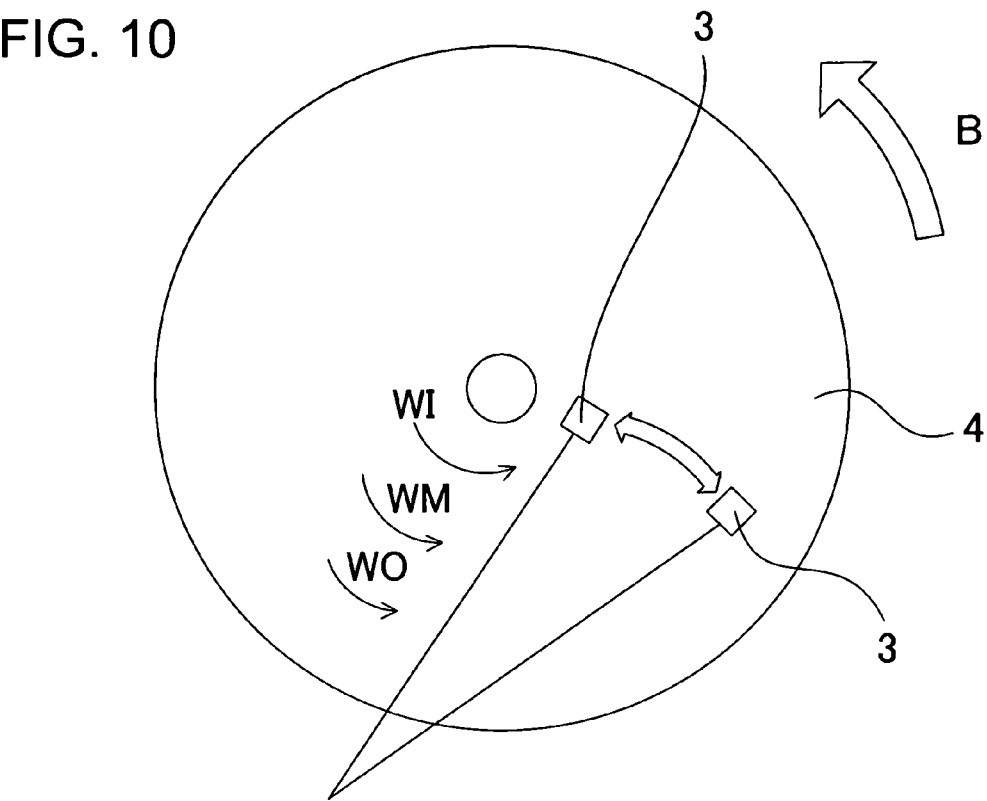
FIG. 10 explains the cylinder position and magnetic spacing in FIG. 9.
FIG. 11 explains the heating power table of FIG. 9.
Figure 12:
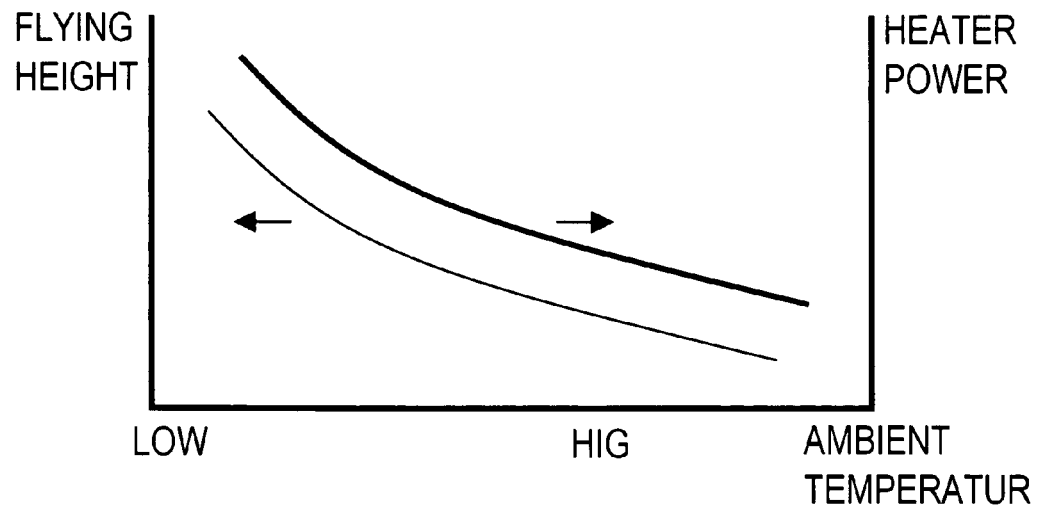
FIG. 12 explains the relation between ambient conditions, magnetic spacing, and heating power in a third embodiment of the invention.
Figure 13:
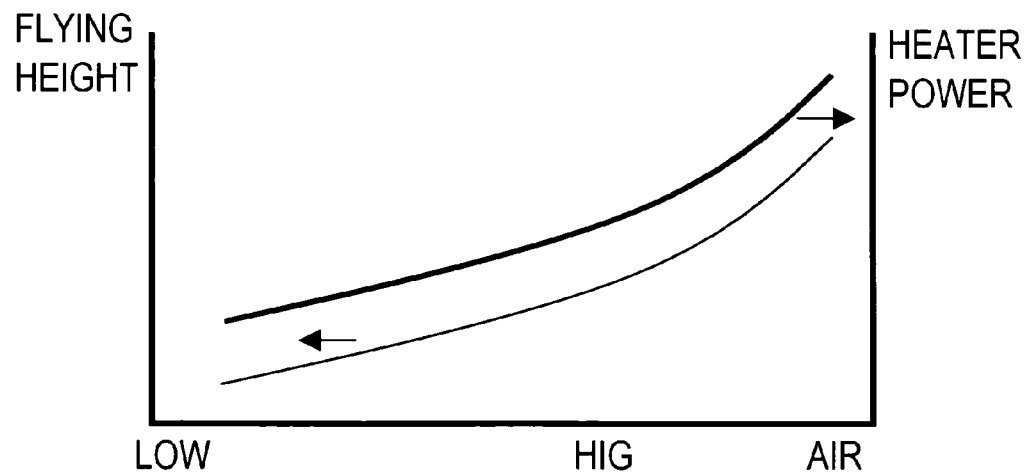
FIG. 13 explains the relation between air pressure, magnetic spacing, and heating power in a fourth embodiment of the invention.
Figure 14:
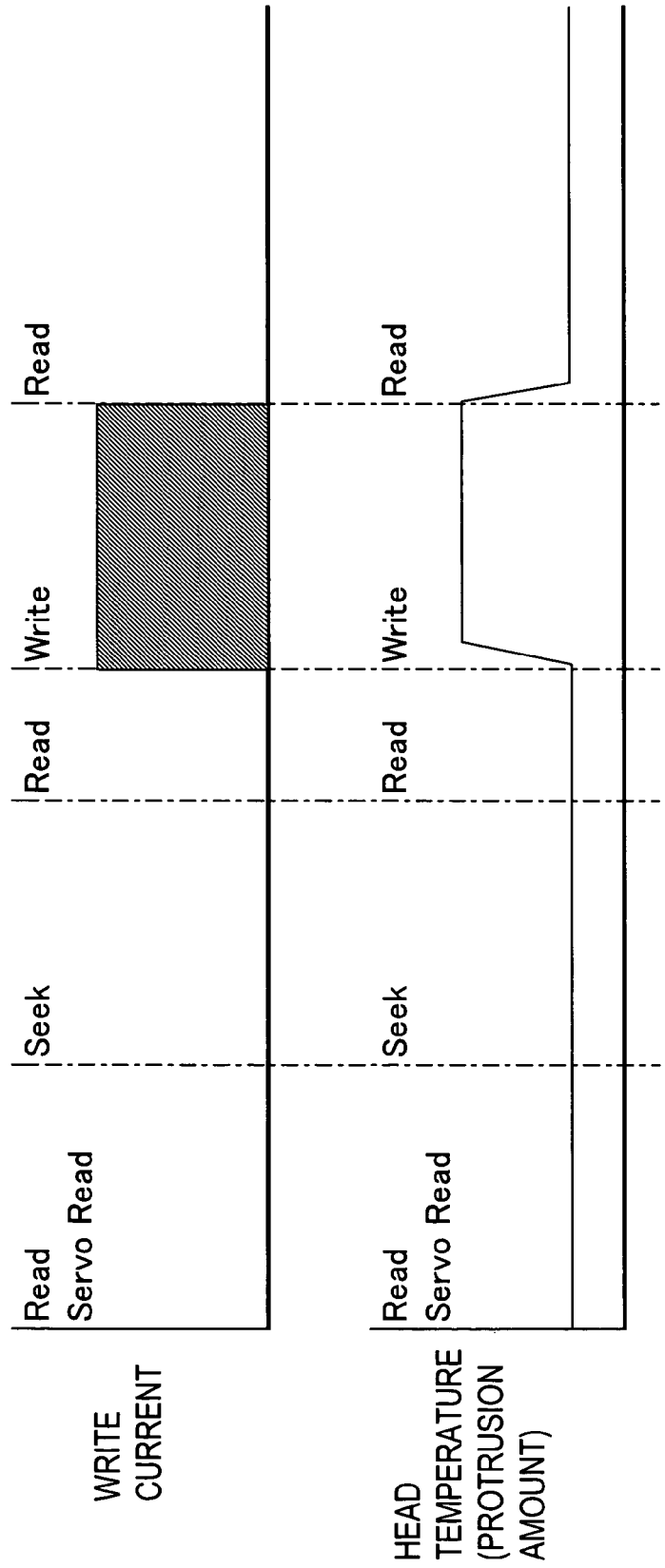
FIG. 14 explains projection amount control of a magnetic head in the prior art.
Figure 15:
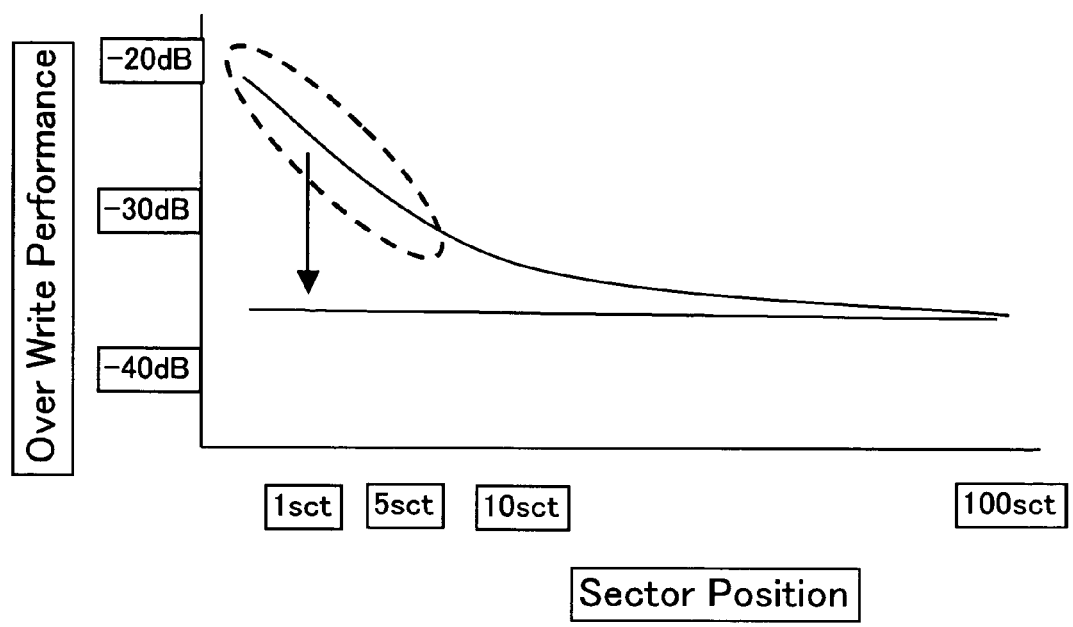
FIG. 15 explains overwrite characteristics in the prior art.

FIG. 9 shows scattering in the magnetic spacing and heating power for different cylinder positions; FIG. 10 explains these results. As shown in FIG. 10, the magnetic head 3 flies due to wind pressure resulting from rotation of the magnetic disk 4. On the other hand, the wind pressure due to rotation of the magnetic disk 4 is comparatively low, with values WI and WO, at the inner and outer cylinders of the magnetic disks 4, and is the comparatively large value WM at the center cylinder position of the magnetic disk 4. As a result, the magnetic spacing at different cylinder positions of a magnetic disk 4 is comparatively small at the inner and outer cylinder positions of the magnetic disk 4, and is comparatively large at the center position, as indicated in FIG. 9.

The heating power P2 is set accordingly. That is, the correction power is measured at a position representative of a zone for each of the heads, and the correction power (heating power) values P2 are stored in a table 50 as shown in FIG. 11, corresponding to the representative cylinder positions for each zone. The MPU 7 references the table 50 according to the cylinder position to be accessed from the HDC 6, uses interpolation to compute the corresponding heating power P2, notifies the HDC 6, and applies the heating power P2 to the heater 36 of the magnetic head 3 during reading and writing.

Similarly, protrusion of the magnetic head due to the heater differs depending on the ambient temperature of the magnetic disk device. That is, when the ambient temperature is low, the heating power is high, and when the ambient temperature is high, the heating power is low. Hence in a similar manner, the correction power is measured for different ambient temperatures, and similarly to FIG. 8 and FIG. 11, correction power (heating power) values P2 are stored in the table 50 corresponding to different ambient temperatures. The MPU 7 references the table 50 according to the temperature detected by a temperature sensor, not shown, retrieves the corresponding heating power P2, notifies the HDC 6, and applies the heating power P2 to the heater 36 of the magnetic head 3 during reading and writing.

Further, because a flying-type head is used, the magnetic spacing differs depending on the air pressure within the magnetic disk device as well. Hence when the air pressure is low, the heating power is made low, and when the air pressure is high, the heating power is made high. That is, similarly to the above, the correction power is measured at different air pressures, and similarly to FIG. 8 and FIG. 11, the correction power (heating power) values P2 are stored in the table 50, corresponding to different air pressures. The MPU 7 references the table 50 according to the air pressure detected by an air pressure sensor, not shown, retrieves the corresponding heating power P2, notifies the HDC 6, and applies the heating power P2 to the heater 36 of the magnetic head 3 during reading and writing.

In this way, the correction power P2 can be set according to the ambient conditions and scattering in the head parameters. In this embodiment, initial measurement values can also be calibrated by performing calibration after device shipment.

OTHER EMBODIMENTS

In the above embodiments, a magnetic disk device in which are mounted two magnetic disks was described; but the invention can also be applied to devices in which one disk, or three or more disks, are mounted. Similarly, the type of magnetic head is not limited to that of FIG. 2 and FIG. 3, and the invention can be applied to other separated-type magnetic heads.

During read operations, power equal to the sum of a first power value and a second power value is supplied to a heating element of the magnetic head, and during write operations using the write element of the magnetic head, power equal to the first power value is supplied to the heating element, and moreover the write element is driven using a write power. Hence protrusion can be controlled according to scattering among heads and changes in ambient conditions by means of the first power value, so that overwrite characteristics can be improved, and read characteristics can be improved as well, so that the performance of the magnetic disk device can be improved.

What is claimed is:

1. A magnetic spacing control method for a magnetic head, which controls the magnetic spacing with respect to a magnetic disk of a magnetic head in which a write element and a read element are separated, the magnetic spacing control method comprising the steps of:
    continuously supplying power value to a heat generating element of said magnetic head to compensate for scattering;
    supplying power equal to the sum of said first power value and a second power value, to a heat generating element of said magnetic head at the time of read operation by said read element;
    driving said write element using a write power, at the time of writing by said write element of said magnetic head while supplying said power equal to said first power value, to aid heat generating element; and
    supplying to said heat generating element a power having a value which is greater than said first power value, and less than sum of said first power value and said second power value when said magnetic head seeks a target track on said magnetic disk.

2. The magnetic spacing control method for a magnetic head according to claim 1, further comprising:
    a step, each time the value of power applied to said heat generating element of said magnetic head is increased, of writing data to said magnetic disk using said write element, thereafter reading data written to said magnetic disk using said read element;
    a step of measuring a signal quality from said read result; and
    a step of calculating said first power value for said magnetic head from said measured signal quality.

3. The magnetic spacing control method for a magnetic head according to claim 2, wherein said calculation step comprises:
    a step of comparing, upon each increase of said power value, said signal quality of the previous measurement with said signal quality of the current measurement;
    a step of detecting, in said comparison, that said signal quality of the current measurement is degraded from said signal quality of the previous measurement, and of storing said power value at the time of detection; and
    a step of calculating said first power value for said magnetic head from said stored power value.

4. The magnetic spacing control method for a magnetic head according to claim 1, further comprising:
    a step of reading from a table said first power value corresponding to a magnetic head to perform access among a plurality of said magnetic heads; and
    a step of supplying power with said power value to said heat generating element.

5. The magnetic spacing control method for a magnetic head according to claim 1, further comprising:
    a step of reading from a table said first power value corresponding to the cylinder position of said magnetic disk accessed by said magnetic head; and
    a step of supplying power with said power value to said heat generating element.

6. The magnetic spacing control method for a magnetic head according to claim 1, further comprising:
    a step of reading from a table said first power value corresponding to the ambient conditions of said magnetic head; and
    a step of supplying power with said power value to said heat generating element.

7. A magnetic disk device, comprising:
    at least one magnetic disk which rotates;
    at least one magnetic head, in which a write element and a read element are separated, and which incorporates a heat generating element;

an actuator, which moves said magnetic head in the radial direction of said magnetic disk; and a control unit, which supplies power equal to a first power value to a heat generating element of said magnetic head to compensate for scattering, supplies power equal to the sum of said first power value and a second power value, to said heat generating element of said magnetic head at the time of read operation by said read element, drives said write element using a write power, at the time of writing by said write element of said magnetic head while supplying said power equal to said first power value, to said heat generating element, and supplies to said heat generating element a power having a value which is greater than said first power value, and less than the sum of said first power value and said second power value when said magnetic head seeks a target track on said magnetic disk.

8. The magnetic disk device according to claim 7, wherein, said control unit, each time the value of the power applied to said heat generating element of said magnetic head is increased, writes data to said magnetic disk using said write element, thereafter reads data written to said magnetic disk using said read element, measures a signal quality, and calculates said first power value for said magnetic head from said measured signal quality.

9. The magnetic disk device according to claim 8, wherein, said control unit, each time said power value is increased, compares said signal quality of the previous measurement with said signal quality of the current measurement, detects that said signal quality of the current measurement is degraded from said signal quality of the previous measurement, stores said power value at the time of detection, and calculates said first power value for said magnetic head from said stored power value.

10. The magnetic disk device according to claim 7, further comprising a table in which are stored said first power values corresponding to each of a plurality of said magnetic heads, and wherein said control unit reads said first power value corresponding to said magnetic head to perform access from said table, and supplies power with said power value to said heat generating element.

11. The magnetic disk device according to claim 7, further comprising a table in which are stored said first power values corresponding to each of a plurality of cylinder positions of said magnetic disk, and wherein said control unit reads said first power value corresponding to the cylinder position of said magnetic disk to be accessed by said magnetic head from said table, and supplies power with said power value to said heat generating element.

12. The magnetic disk device according to claim 7, further comprising a table in which are stored said first power values corresponding to respective ambient conditions, and wherein said control unit reads said first power value corresponding to the ambient conditions of said magnetic head from said table, and supplies power with said power value to said heat generating element.

13. A read/write circuit for performing reading and writing of data from and onto a magnetic disk using a magnetic head in which a write element and a read element are separated and which incorporates a heat generating element, comprising:

a read circuit which performs read operation by said read element, a write circuit which performs write operation by driving said write element using a write power; and a control unit, which continuously supplies power equal to a first power value to a heat generating element of said magnetic head to compensate for scattering, supplies power equal to the sum of said first power value and a second power value, to said heat generating element of said magnetic head at the time of read operation by said read element, drives said write element using a write power, at the time of writing by said write element of said magnetic head while supplying said power equal to said first power value, to said heat generating element, and supplies to said heat generating element a power having a value which is greater than said first power value, and less than the sum of said first power value and said second power value when said magnetic head seeks a target track on said magnetic disk.

14. The read/write circuit according to claim 13, further comprising a table in which are stored said first power values corresponding to each of a plurality of said magnetic heads, and wherein said read and write circuits reads said first power value corresponding to said magnetic head to perform access from said table, and supplies power with said power value to said heat generating element.

15. The read/write circuit according to claim 13, further comprising a table in which are stored said first power values corresponding to each of a plurality of cylinder positions of said magnetic disk, and wherein said first power value corresponding to the cylinder position of said magnetic disk to be accessed by said magnetic head is read from said table, and said read and write circuits supplies power with said power value to said heat generating element.

16. The read/write circuit according to claim 13, further comprising a table in which are stored said first power values corresponding to respective ambient conditions, and wherein said first power value corresponding to the ambient conditions of said magnetic head is read from said table, and said read and write circuit supplies power with said power value to said heat generating element.

* * * * *

UNITED STATES PATENT AND TRADEMARK OFFICE
CERTIFICATE OF CORRECTION

| | |
|---|---|
| PATENT NO. | : 7,486,465 B2 |
| APPLICATION NO. | : 11/486328 |
| DATED | : February 3, 2009 |
| INVENTOR(S) | : Masao Kondo |

Page 1 of 1

It is certified that error appears in the above-identified patent and that said Letters Patent is hereby corrected as shown below:

In the Claims:

Col. 10, line 3, delete "power value" and insert --power equal to a first power value--.

Col. 10, line 16, delete "than sum" and insert --than the sum--.

Signed and Sealed this

Twenty-eighth Day of April, 2009

JOHN DOLL
*Acting Director of the United States Patent and Trademark Office*